US012656055B2

(12) United States Patent
Pearson et al.

(10) Patent No.: US 12,656,055 B2
(45) Date of Patent: Jun. 16, 2026

(54) ROLL-BOND COMPONENT FORMING CART BAY WALLS WITH LIQUID CIRCULATION AND A HIGH EFFICIENCY MICRO-CHILLER HEAT SINK

(71) Applicant: B/E Aerospace, Inc., Winston Salem, NC (US)

(72) Inventors: Matthew R. Pearson, Hartford, CT (US); Brian E. St. Rock, Andover, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 384 days.

(21) Appl. No.: 18/158,921

(22) Filed: Jan. 24, 2023

(65) Prior Publication Data

US 2023/0400250 A1    Dec. 14, 2023

Related U.S. Application Data

(60) Provisional application No. 63/350,352, filed on Jun. 8, 2022.

(51) Int. Cl.
*F25D 31/00* (2006.01)
*B64D 11/04* (2006.01)
(Continued)

(52) U.S. Cl.
CPC ............ *F25D 31/005* (2013.01); *B64D 11/04* (2013.01); *B64D 13/06* (2013.01); *F25D 17/02* (2013.01);
(Continued)

(58) Field of Classification Search
CPC .............................. B64D 11/04; B64D 13/06; B64D 2013/0629; F25D 31/005; F25D 17/02; F25D 23/061
See application file for complete search history.

(56) References Cited

U.S. PATENT DOCUMENTS

| | | | |
|---|---|---|---|
| 3,216,205 A | 11/1965 | Neal et al. | |
| 4,157,112 A | 6/1979 | Swiderski | |

(Continued)

FOREIGN PATENT DOCUMENTS

| | | |
|---|---|---|
| CN | 106885413 | 3/2020 |
| CN | 110864491 | 3/2020 |

(Continued)

OTHER PUBLICATIONS

KR200402138Y1MT (Year: 2004).*

(Continued)

*Primary Examiner* — Gordon A Jones
(74) *Attorney, Agent, or Firm* — SNELL & WILMER L.L.P.

(57) ABSTRACT

A roll bond evaporator and micro-chiller unit assembly, apparatus and method is provided. The assembly includes a housing; a compartment disposed in the housing wherein the compartment is formed by at least one side with a roll bond evaporator component using embedded tubes to circulate chilled liquid to chill an interior cavity of the compartment; and a micro-chiller unit configured within the housing to chill the liquid circulated in the roll bond evaporator component across the at least one side of the compartment wherein the roll bond evaporator component intercepts heat seepage into the interior cavity by circulation of chilled liquid to maintain a steady state chilled condition of the interior cavity.

16 Claims, 5 Drawing Sheets

(51) Int. Cl.
B64D 13/06 (2006.01)
F25D 17/02 (2006.01)
F25D 23/06 (2006.01)
(52) U.S. Cl.
CPC .... F25D 23/061 (2013.01); B64D 2013/0629 (2013.01)

(56) References Cited

U.S. PATENT DOCUMENTS

| | | | |
|---|---|---|---|
| 4,361,014 A * | 11/1982 | Blain | A47J 39/006 62/DIG. 13 |
| 5,491,979 A | 2/1996 | Kull | |
| 5,513,500 A | 5/1996 | Fischer | |
| 5,826,432 A | 10/1998 | Ledbetter | |
| 5,902,618 A | 5/1999 | Haasis, Jr. | |
| 6,832,504 B1 | 12/2004 | Birkmann | |
| 6,845,627 B1 | 1/2005 | Buck | |
| 7,007,501 B2 | 3/2006 | Hu | |
| 8,607,586 B2 | 12/2013 | Lu | |
| 8,959,941 B2 | 2/2015 | Campbell | |
| 9,191,999 B2 | 11/2015 | Anthony et al. | |
| 9,267,714 B2 | 2/2016 | Hou et al. | |
| 9,840,125 B2 * | 12/2017 | Burd | B60H 1/00014 |
| 9,921,007 B2 | 3/2018 | Harper et al. | |
| 9,963,240 B2 | 5/2018 | Boodaghians et al. | |
| 9,987,902 B2 | 6/2018 | Burd | |
| 10,137,987 B2 | 11/2018 | Burd | |
| 10,252,805 B2 | 4/2019 | Chrabascz et al. | |
| 10,472,066 B2 | 11/2019 | Singleton | |
| 10,492,603 B2 | 12/2019 | Garcia et al. | |
| 11,136,125 B2 | 10/2021 | Tsai et al. | |
| 11,306,958 B2 | 4/2022 | Moran | |
| 2001/0008071 A1 * | 7/2001 | Macias | H01L 23/467 257/E23.099 |
| 2003/0042361 A1 | 3/2003 | Simadiris | |
| 2005/0034477 A1 | 2/2005 | Hu | |
| 2005/0210910 A1 | 9/2005 | Rigney | |
| 2008/0087039 A1 | 4/2008 | Reed | |
| 2009/0000309 A1 | 1/2009 | Hershberger et al. | |
| 2009/0000320 A1 * | 1/2009 | Walton | B67D 3/0032 62/137 |
| 2009/0044547 A1 | 2/2009 | Oswald | |
| 2009/0107159 A1 | 4/2009 | Mann, III | |
| 2009/0224564 A1 | 9/2009 | O'Brien et al. | |
| 2009/0301120 A1 | 12/2009 | Godecker | |
| 2010/0071384 A1 * | 3/2010 | Lu | F25D 15/00 62/3.2 |
| 2011/0056580 A1 | 3/2011 | Hoefle et al. | |
| 2011/0220527 A1 | 9/2011 | Baatz | |
| 2011/0232326 A1 * | 9/2011 | Pflomm | F25B 39/022 62/515 |
| 2012/0047911 A1 | 3/2012 | Bhavsar et al. | |
| 2013/0047630 A1 | 2/2013 | Lu | |
| 2013/0047657 A1 | 2/2013 | Oswald | |
| 2013/0206905 A1 | 8/2013 | Savian et al. | |
| 2013/0219948 A1 | 8/2013 | Aurekoski | |
| 2013/0247590 A1 | 9/2013 | Lu et al. | |
| 2014/0000837 A1 | 1/2014 | Simadiris | |
| 2014/0102120 A1 | 4/2014 | Libis et al. | |
| 2014/0202577 A1 | 7/2014 | Webster, III | |
| 2014/0299296 A1 | 10/2014 | Shubat | |
| 2015/0034668 A1 * | 2/2015 | Minard | A23G 9/103 222/1 |
| 2015/0059363 A1 * | 3/2015 | Burd | B62B 5/0447 62/3.62 |
| 2015/0059385 A1 | 3/2015 | Burd | |
| 2015/0089970 A1 | 4/2015 | Lu | |
| 2015/0099446 A1 | 4/2015 | Burd | |
| 2015/0259073 A1 | 9/2015 | Dabaga et al. | |
| 2015/0266353 A1 | 9/2015 | Lu et al. | |
| 2015/0289643 A1 | 10/2015 | Holtorf et al. | |
| 2016/0030234 A1 | 2/2016 | Lofy | |
| 2016/0114880 A1 * | 4/2016 | Reiss | B64C 11/04 307/10.1 |
| 2016/0338488 A1 | 11/2016 | Garcia | |
| 2016/0340044 A1 | 11/2016 | Schalla et al. | |
| 2017/0115039 A1 * | 4/2017 | St. Rock | H05K 7/2029 |
| 2017/0122647 A1 | 5/2017 | Burd | |
| 2017/0282679 A1 * | 10/2017 | Tsai | F25B 21/02 |
| 2018/0031327 A1 | 2/2018 | Chou et al. | |
| 2018/0127101 A1 * | 5/2018 | Burd | B64D 13/08 |
| 2018/0181919 A1 | 6/2018 | Jobling | |
| 2018/0201374 A1 | 7/2018 | Trumper | |
| 2018/0281957 A1 * | 10/2018 | Tsai | F25D 15/00 |
| 2019/0002105 A1 | 1/2019 | Moran | |
| 2019/0055880 A1 | 2/2019 | Noderer | |
| 2020/0138043 A1 * | 5/2020 | Hoerter | F25B 21/02 |
| 2020/0189531 A1 | 6/2020 | Baldovino | |
| 2020/0326124 A1 * | 10/2020 | Fonte | A23G 9/28 |
| 2020/0348089 A1 | 11/2020 | Halbe et al. | |
| 2020/0408452 A1 | 12/2020 | Alexander | |
| 2021/0031928 A1 * | 2/2021 | Burd | F25D 17/067 |
| 2021/0129992 A1 | 5/2021 | Sankrithi | |
| 2021/0140699 A1 | 5/2021 | Moran | |
| 2021/0278112 A1 * | 9/2021 | Jeong | F25D 21/12 |
| 2021/0285697 A1 * | 9/2021 | Burd | B64D 11/04 |
| 2021/0387557 A1 | 12/2021 | Himmelreich et al. | |
| 2022/0049890 A1 | 2/2022 | Alexander | |
| 2022/0095837 A1 * | 3/2022 | Bigott | A47J 36/2483 |
| 2022/0332427 A1 | 10/2022 | Will et al. | |
| 2023/0099698 A1 * | 3/2023 | Nikonchuk | F25B 21/02 62/3.3 |
| 2023/0400233 A1 | 12/2023 | Jakobsen | |

FOREIGN PATENT DOCUMENTS

| | | |
|---|---|---|
| DE | 19952524 | 5/2001 |
| DE | 102012010576 | 11/2013 |
| DE | 102017113619 | 12/2018 |
| DE | 102017130722 | 6/2019 |
| EP | 1527996 | 3/2008 |
| EP | 2937284 | 10/2015 |
| EP | 3878745 | 9/2021 |
| EP | 4289736 | 12/2023 |
| GB | 654678 | 6/1951 |
| GB | 2095387 | 9/1982 |
| GB | 2580026 | 7/2020 |
| JP | 07218095 | 8/1995 |
| JP | 4677219 | 4/2011 |
| KR | 200402138 | 11/2005 |
| KR | 20060063108 | 6/2006 |
| WO | 2011150018 | 12/2011 |
| WO | 2015031888 | 3/2015 |
| WO | 2021110357 | 6/2021 |
| WO | 2021243155 | 12/2021 |

OTHER PUBLICATIONS

USPTO; Non-Final Office Action dated Oct. 23, 2024 in U.S. Appl. No. 18/100,947.
USPTO; Notice of Allowance dated Jan. 22, 2025 in U.S. Appl. No. 18/100,947.
USPTO; Advisory Action dated Apr. 18, 2025 in U.S. Appl. No. 18/100,906.
European Patent Office, European Search Report dated Oct. 9, 2023 in Application No. 23177789.7.
USPTO; Requirement for Restriction/ Election dated Nov. 12, 2024 in U.S. Appl. No. 18/100,985.
USPTO; Non-Final Office Action dated Sep. 30, 2024 in U.S. Appl. No. 18/100,906.
USPTO; Notice of Allowance dated Jan. 13, 2025 in U.S. Appl. No. 18/100,947.
USPTO; Final Office Action dated Feb. 12, 2025 in U.S. Appl. No. 18/100,906.
European Patent Office, European Office Action dated Mar. 20, 2025 in Application No. 23178235.0.
European Patent Office, European Office Action dated Mar. 20, 2025 in Application No. 23177782.2.
European Patent Office, European Office Action dated Mar. 21, 2025 in Application No. 23178082.6.

(56) References Cited

OTHER PUBLICATIONS

USPTO; Notice of Allowance dated Mar. 13, 2025 in U.S. Appl. No. 18/100,947.
USPTO; Non-Final Office Action dated Mar. 13, 2025 in U.S. Appl. No. 18/100,985.
USPTO; Non-Final Office Action dated Dec. 11, 2024 in U.S. Appl. No. 18/158,873.
USPTO; Requirement for Restriction/ Election dated Jun. 5, 2025 in U.S. Appl. No. 18/100,840.
USPTO; Non-Final Office Action dated Jun. 20, 2025 in U.S. Appl. No. 18/158,873.
European Patent Office, European Office Action dated Jun. 17, 2025 in Application No. 23177938.0.
European Patent Office, European Office Action dated Aug. 13, 2025 in Application No. 23177791.3.
USPTO; Final Office Action dated Sep. 4, 2025 in U.S. Appl. No. 18/100,985.
USPTO; Advisory Action dated Sep. 11, 2025 in U.S. Appl. No. 18/158,873.
European Patent Office, European Search Report dated Oct. 12, 2023 in Application No. 23177938.0.
European Patent Office, European Search Report dated Oct. 13, 2023 in Application No. 23177791.3.
European Patent Office, European Search Report dated Oct. 12, 2023 in Application No. 23178235.0.
European Patent Office, European Search Report dated Oct. 26, 2023 in Application No. 23177782.2.
European Patent Office, European Search Report dated Oct. 30, 2023 in Application No. 23178082.6.
USPTO; Non-Final Office Action dated Oct. 2, 2025 in U.S. Appl. No. 18/100,840.
USPTO; Advisory Action dated Oct. 29, 2025 in U.S. Appl. No. 18/100,985.
European Patent Office, European Office Action dated Jan. 15, 2026 in Application No. 23177782.2.
USPTO; Non-Final Office Action dated Apr. 8, 2026 in U.S. Appl. No. 18/100,840.

* cited by examiner

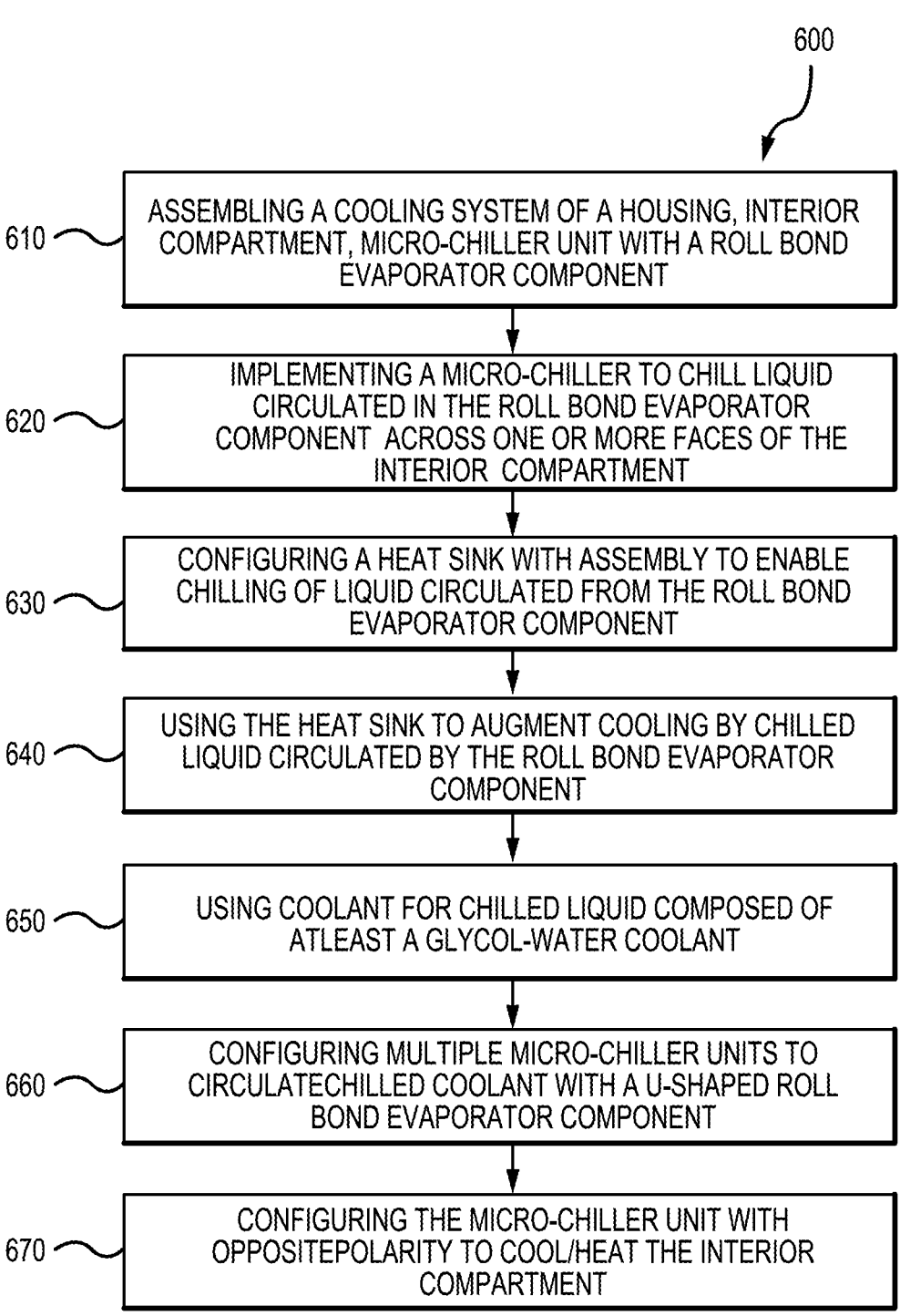

600

610 — ASSEMBLING A COOLING SYSTEM OF A HOUSING, INTERIOR COMPARTMENT, MICRO-CHILLER UNIT WITH A ROLL BOND EVAPORATOR COMPONENT

620 — IMPLEMENTING A MICRO-CHILLER TO CHILL LIQUID CIRCULATED IN THE ROLL BOND EVAPORATOR COMPONENT ACROSS ONE OR MORE FACES OF THE INTERIOR COMPARTMENT

630 — CONFIGURING A HEAT SINK WITH ASSEMBLY TO ENABLE CHILLING OF LIQUID CIRCULATED FROM THE ROLL BOND EVAPORATOR COMPONENT

640 — USING THE HEAT SINK TO AUGMENT COOLING BY CHILLED LIQUID CIRCULATED BY THE ROLL BOND EVAPORATOR COMPONENT

650 — USING COOLANT FOR CHILLED LIQUID COMPOSED OF ATLEAST A GLYCOL-WATER COOLANT

660 — CONFIGURING MULTIPLE MICRO-CHILLER UNITS TO CIRCULATECHILLED COOLANT WITH A U-SHAPED ROLL BOND EVAPORATOR COMPONENT

670 — CONFIGURING THE MICRO-CHILLER UNIT WITH OPPOSITEPOLARITY TO COOL/HEAT THE INTERIOR COMPARTMENT

FIG.6

ROLL-BOND COMPONENT FORMING CART BAY WALLS WITH LIQUID CIRCULATION AND A HIGH EFFICIENCY MICRO-CHILLER HEAT SINK

CROSS-REFERENCE TO RELATED APPLICATIONS

This application claims benefit of priority under 35 U.S.C. 120 to U.S. Provisional Application Ser. No. 63/350,352 entitled "HIGH EFFICIENCY MICRO-CHILLER UNIT," filed on Jun. 8, 2022, the entire contents of which are incorporated by reference.

FIELD

The present disclosure generally relates to cooling enclosures within an aircraft, and more specifically to apparatus, assembly, and a method of manufacture cart bays with roll bond a cooling system configured for enclosures within, for example, an in-seat compartment onboard an aircraft.

BACKGROUND

Premium class passengers that include first class and business are generally considered the most profitable passenger segment for carriers, and therefore carriers' desire to provide the premium class passengers with the high comfort and service. This includes extending the class of service to not only commonly considered options such as passenger seating and space, but also to other services provided including providing chilled refreshments in a mini bar in the aircraft galley or in an in-seat passenger seat compartment. It has not been feasible to station compact refrigerator-type compartments in an aircraft mini-bar, galley monument, seat station or other such smaller enclosure in the aircraft interior.

SUMMARY

In various embodiments, an assembly for an enclosure with a controlled environmental in an aircraft is provided. The assembly includes a housing; a compartment disposed in the housing wherein the compartment is formed by at least one side with a roll bond evaporator component using embedded tubes to circulate chilled liquid to chill an interior cavity of the compartment; and a micro-chiller unit configured within the housing to chill liquid circulated in the roll bond evaporator component across the at least one side of the compartment wherein the roll bond evaporator component is configured to intercept heat seepage into the interior cavity by circulation of the chilled liquid to maintain a steady state chilled condition of the interior cavity.

In various embodiments, the micro-chiller unit further comprises a heat sink to remove heat from the liquid when chilling liquid circulated by the roll bond evaporator component across the at least one side of the compartment.

In various embodiments, the heat sink is configured to augment cooling of the roll bond evaporator component in response to decreasing a temperature of the interior cavity.

In various embodiments, the heat sink is configured to act with the roll bond evaporator component to effectuate a pull-down temperature of the interior cavity of the compartment wherein the pull-down temperature comprises the steady state chilled condition of the interior cavity of the temperature within a range of 36° F. to 50° F.

In various embodiments, the liquid is a mixture comprising a set of coolants of at least a glycol-water coolant, an ethylene glycol coolant, and a propylene glycol coolant.

In various embodiments, the assembly further comprises a pair of micro-chiller units configured on a side of the interior cavity; and a pump positioned between the pair of micro-chiller units; wherein the pump is configured to circulate the liquid between each micro-chiller unit to chill the liquid and to chill the interior cavity by circulation of the chilled liquid via at least one side of the interior cavity that comprises the roll bond evaporator component.

In various embodiments, the roll bond evaporator component is configured in a U-shape.

In various embodiments, multiple sides of the interior cavity are formed by the U-shape of the roll bond evaporator component.

In various embodiments, the housing is configured as a galley bay of an aircraft galley monument wherein the galley bay is configured to operate a stand-alone unit.

In various embodiments, the micro-chiller unit is configured to apply a polarity in a forward direction to cool the interior cavity with the chilled liquid circulated in the roll bond evaporator component, and to apply the polarity in a reverse direction to heat the interior cavity with warmed liquid circulated in the roll bond evaporator component.

In various embodiments, an apparatus is provided. The apparatus includes an exterior housing formed to be integrated in a galley bay, wherein the exterior housing is configured with a set of elements comprising: an interior housing; a roll bond evaporator component; and a micro-chiller unit; wherein the interior housing is chilled by liquid circulated between the micro-chiller unit mounted on a side of the interior housing and the roll bond evaporator component that forms at least one side of the interior housing; wherein an input of the roll bond evaporator component is attached to the micro-chiller unit configured to receive liquid chilled by the micro-chiller unit; wherein an output of the roll bond evaporator component is attached to the micro-chiller unit to send liquid to remove heat intercepted from the at least side of the interior housing formed by the roll bond evaporator component.

In various embodiments, the roll bond evaporator component is configured to chill the interior housing by chilled liquid circulated in a set of tubes configured in a serpentine pattern across at least one face of a side of the interior housing formed by the roll bond evaporator component and enables an interior space to be exposed to the chilled liquid circulated within the roll bond evaporator component for cooling the interior space.

In various embodiments, the roll bond evaporator component is configured in a U-shape to form more than one side of the interior housing.

In various embodiments, the liquid is a mixture comprising a set of coolants of at least a glycol-water coolant, an ethylene glycol coolant, and a propylene glycol coolant.

In various embodiments, the exterior housing is configured for a galley bay wherein the galley bay is configured to operate as a stand-alone unit.

In various embodiments, the apparatus further comprises a pair of micro-chiller units configured on a side of the interior housing; and a pump positioned between the pair of micro-chiller units; wherein the pump is configured to circulate the liquid between each micro-chiller unit to chill the liquid and to chill the interior housing by circulation of the chilled liquid via at least one side of the interior housing that comprises the roll bond evaporator component.

In various embodiments, a method to manufacture of apparatus with a roll bond evaporator component is provided. The method includes disposing a compartment in an enclosure wherein at least one side of the compartment is formed with the roll bond evaporator component wherein the roll bond evaporator component uses embedded tubes to circulate chilled liquid to chill an interior cavity of the compartment; and mounting a micro-chiller unit within the enclosure to chill liquid circulated in the roll bond evaporator component across the at least one side of the compartment wherein the roll bond evaporator component is configured to intercept heat seepage into the interior cavity by circulation of the chilled liquid to maintain a steady state chilled condition of the interior cavity.

In various embodiments, the method comprises configuring the enclosure as a standalone unit that enables chilling by liquid circulated in the roll bond evaporator component across the at least one side of the compartment.

In various embodiments, the liquid comprises a mixture comprising a set of coolants of at least a glycol-water coolant, an ethylene glycol coolant, and a propylene glycol coolant.

In various embodiments, the roll bond evaporator component is configured in a U-shape to form more than one side of the compartment.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 6 illustrates a diagram of a flowchart of the assembly of the roll bond component with the micro-chiller unit in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
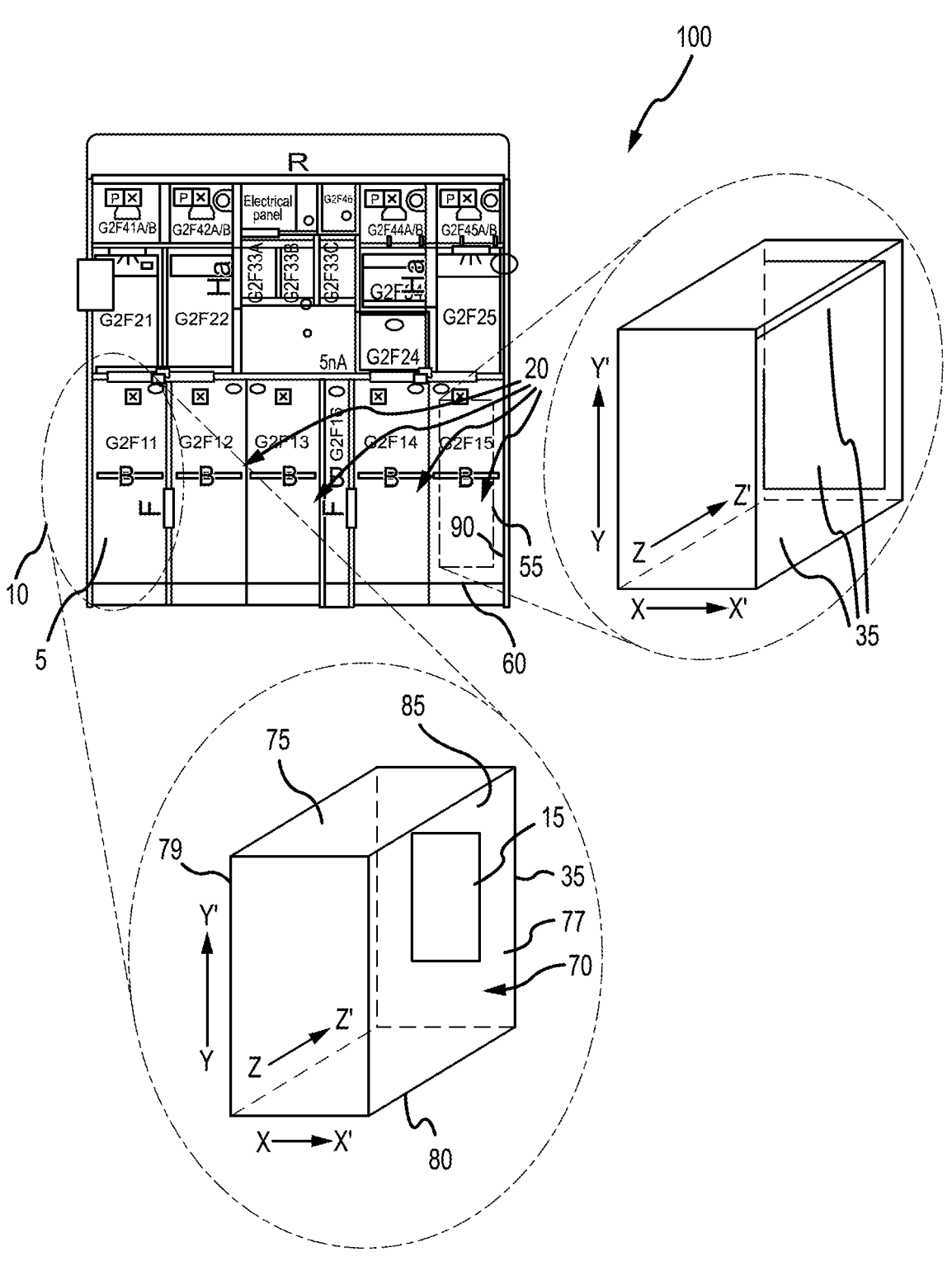
FIG. 1 illustrates a diagram of a galley unit with a cart bay configured with a roll bond evaporator component and a micro-chiller unit in accordance with various embodiments.

Referring to FIG. 1, FIG. 1 illustrates a galley unit 100 configured a plurality of sub-units that can include cart bays 20 which can be configured as refrigeration units with a roll bond evaporator component 35 in the galley sub-unit 10, in accordance with various embodiments. When a cart 5 is stowed in the galley unit 100, the cart 5 (and food contents therein) should be maintained with a storage temperature of about within range of 38° F. (3.333 degree Celsius) to 48° F. (8.889 degree Celsius)+/−2° F. degrees (e.g., in a vicinity of 39.2° F./4° C.). In various embodiments, the cart bay 20 may be chilled to approximately this temperature by cooled air generated or expelled by a micro-chiller unit 15 configured inside the cart bay 20 and by the resultant cooled air airflow distributed throughout the cart bay 20 by the micro-chiller unit 15.

In various embodiments, the sub-unit 10 includes a housing 60, a door 55 coupled to the housing 60 for movement between a closed position and an open position. In various embodiments, chilled liquid is circulated in one or more walls (conductive plates) that make up the sides of the housing 60 or one or more walls of an interior cavity 70 (or compartment) disposed inside the housing 60. In various embodiments, an insulated layer 90 may be configured between the interior cavity 70 and the housing 60. Each cart bay 20 is configured with its own micro-chiller unit 15 for individualized circulation of chilled liquid to operate as a standalone isolated liquid chilling system for the cart bay 20 that is not a centralized system among the cart bays 20 in the galley unit 100. Hence, because each cart bay 20 is configured with its own chilling operation and micro-chiller unit 15 to pump chilled liquid in a closed loop system within walls of a chilled interior cavity 70 of cart bay 20, this modular structure allows for flexibility in configuring chilled cart bay sub-units that make up the overall galley unit 100. In various embodiments, the micro-chiller unit 15 enables chilling of liquid via a lightweight decentralized chilling system with siloed circulated and recirculated chilled air in each sub-unit 10.

In various embodiments, each cart bay 20 has its own roll bond evaporator component 35 configured to form at least one wall that lines an interior compartment side within the cart bay 20. The roll bond evaporator component 35 can be configured differently in each of the cart bays 20 for different levels of chilling (or draw down times to a desired temperature) and for storing of different refrigerated products suitable for different chilled temperatures. In various embodiments, by implementing more than one different configuration of the roll bond evaporator component 35 configured in each cart bay 20, power usage may be conserved and efficiency in power consumption achieved by different levels of liquid chilled and circulated internally based on chilled temperatures and configurations of the roll bond evaporator component 35 internally for chilled interior cavities 70.

In various embodiments, a heat exchange for cooling the interior cavity 70 is performed by a liquid (e.g., glycol, ethylene glycol, propylene glycol, water solutions, dielectric fluids, antifreeze liquids) which is circulated through a set or tubes configured within the roll bond evaporator component 35 that allows heat to be removed by the thermoelectric elements and a heat sink configured with a micro-chiller unit 15 for each cart bay 20. In various embodiments, a low wattage (e.g., at any wattage in the range of 1-2 watts, 1-5 watts, etc.) gear pump can circulate the chilled fluid of the roll bond evaporator component 35. The chilled liquid provides a heat exchange in the cavity walls and causes chilled air to be circulated in the interior. The chilled liquid can be circulated in roll bond evaporator component 35 configured to make up one or more (i.e., multiple walls) sides of the interior cavity 70 of the cart bay 20. This can include sets of one, two, three etc. that may comprise walls of the interior cavity 70.

In various embodiments, by increasing the number of walls of the interior cavity 70 configured for the cooling liquid to circulate (i.e., configured with the roll bond evaporator component 35) can have an effect to increase the pull-down rate of cooling the interior cavity 70 to the desired chilled temperature and to maintain the chilled temperature in a steady state condition. The steady-state condition occurs when an optimum current is applied to the thermo-electric elements to generate a maximum temperature difference under a steady state current operation for cooling the liquid. This is in contrast to a supercooling state condition that is transitory state caused by an instantaneous application of a pulse current to increase the cold side to a peak overshoot value due to accumulated heat in the thermo-electric element and provide an instant colder affect to the chill the cooling liquid as it is circulated. The accumulated heat is not uniform across the thermo-electric element and is dependent semiconductor material properties of the thermo-electric elements. In various embodiments, at a steady state condition, the chilled or pulled down temperature would be within a range of 38° F. (3.3° C.) to 48° F. (8.8° C.)+/−2° F. (+/−1° C. In various embodiments, the chilled temperature in a steady-state operating condition may be of the interior cavity can be in a vicinity of 39.2° F./4° C.

In various embodiments, the roll bond evaporator component 35 can be configured in panels or sheets disposed of in either side of the interior cavity and can comprise a graphite composite to enhance in-plane conductivity for thermal cooling of the interior cavity 70. Other various embodiments may include use of traditional or oscillating pipes to replace the pump for circulating the liquid for heat transfer operations to cool the interior cavity or in instances, with a reverse polarity applied to the thermo-electric elements of the micro-chiller unit in oscillating heated pipes by liquid flow. This configuration can be installed with the roll bond evaporator component 35 to effectively operate without a pump for liquid circulation.

In various embodiments, each side of the housing 60 of the cart bay 20 configured with the roll bond evaporator component 35, enables the chilled liquid that circulates in the wall to intercept heat that leaks in through the housing sides of the cart bay 20 before it enters the chilled air of the interior compartment within the cart bay and require a larger heat sink to affect a same level of cooling operation. The roll bond evaporator component 35 acts with a heat sink used in chilling of the liquid in use on the front end of a closed looped chilling system to cool the liquid circulated and to effectuate the timing or speed to the desired pull-down temperature.

In various embodiments, the micro-chiller unit 15 illustrated in FIG. 1 may be configured in an in-seat monument with the roll bond evaporator component 35 integrated or configured as one or more walls of its interior cavity 70. In various embodiments, the roll bond evaporator component 35 may be configured with micro-chiller units 15 used in aircraft galley carts or galley compartments or other enclosures in the aircraft. It is contemplated that the roll bond evaporator component 35 can be configured for use in variety of aircraft monuments with the interior of the aircraft. It is also contemplated that the roll bond evaporator component 35 can be integrated to form several walls of the interior cavity 70 with the micro-chiller unit 15 including at least sets of one, two, and three walls. The sets of walls can include various numbers of walls configured with serpentine structures of tube carrying chilled coolant for cooling the interior cavity 70 and may comprise various configurations or combinations of the top side 75 (Y'-X', Y'-Z'), the rear side (X-Y', Z'-X'), the bottom side 80 (X-X', Y-Z'), the right side 77 (Y-Y', X'-Z'), and the left side 79 (Y-Y', Z-Z') of the roll bond evaporator component 35. In various embodiments, the roll bond evaporator component 35 may be configured as a single wall (i.e., the rear wall (rear side 85 (X-Y', Z'-X') of the interior cavity 70). In various embodiments, the roll bond evaporator component 35 may be configured as the both the rear wall and the bottom wall (i.e., bottom side (X-X', Y-Z')), or in the other walls. There are variety of different combinations to use the roll bond evaporator component 35 in walls contemplated that form sides of the interior cavity 70 for chilling the interior space of the cart bay 20.

In various embodiments, for enhanced food service operations in-flight, having an increased number of carts 5 with a corresponding number of additional cart bays 20 available which can be provided with cooling capabilities to maintain the appropriate food storage temperature using one or more micro-chiller units 15 in each cart bay 20; can provide for the storage of more perishable food and may, for example, allow for extended passenger food services to be provided on long haul flights (e.g., for example more hot meal services).

In various embodiments, the galley unit (structure) 100 illustrated in FIG. 1 can include multiple cart bays 20 or can be configured with as single cart bay 20 (as desired) to include a single chilled trolley or cart 5. In various embodiments, a chilled cart bay 20 can be configured with a single sided micro-chiller unit 15 attached to a rear wall (rear side 85 (X-Y', Z'-X') of the interior cavity 70) of the cart bay 20 to distribute cooled air around via the chilled circulated coolant (across various sides of the cart 5 stowed) in the interior of the cart bay 20 interior. In various embodiments, the cooled airflow resultant from the chilled liquid circulated can be configured to be spread across the various sides of the cart 5 or around the top and bottom sides of the cart 5.

In various embodiments, the galley unit 100 can be deployed outside an aircraft galley area with a different configuration or number of stacked together or spaced apart sub-units 10. In various implementations, a pair of sub-units 10 (i.e., a set of single lower set of sub-units 10) can be configured in a module to support a small counter, or a set of lower/upper sub-units 10 with different depths paired with siloed chilling capabilities and a counter between for counter workspace may also be configured.

In various embodiments, because each chilled cart bay 20 is an individual (siloed, isolated) sub-unit 10 that can be cooled without a central heat exchanger for distribution of the cooled air in multiple cart bays, a more customized compact set of cart bays 20 can be positioned outside of a galley location and within interior passenger seating locations or modules of the aircraft. This can enable flexibility in configuring multiple less centralized food stations throughout the interior of the aircraft.

In various embodiments, because each unit (i.e., cart bay 20 unit) or other isolated chilled unit modular configuration that includes the galley type units within cart bays 20 or with chilled compartments provides for different aircraft locations. For instance, the units can be positioned within interior aircraft locations that can enable access for passengers to food items stored remotely from a centralized galley facility in an aircraft. This can provide or make available social congregation space for passengers alongside cooled refreshments and condiments in more interior locations of the aircraft.

Also, distributed compact smaller self-contained chilled cart bays 20 with their own micro-chiller units 15 can allow passengers to independently service themselves with food items while limiting direct contact (i.e., for social distancing) between passengers, crew, and reducing the number of crew ordinarily employed to serve refreshments and food items in flight saving the carrier operating costs.

Figure 2:
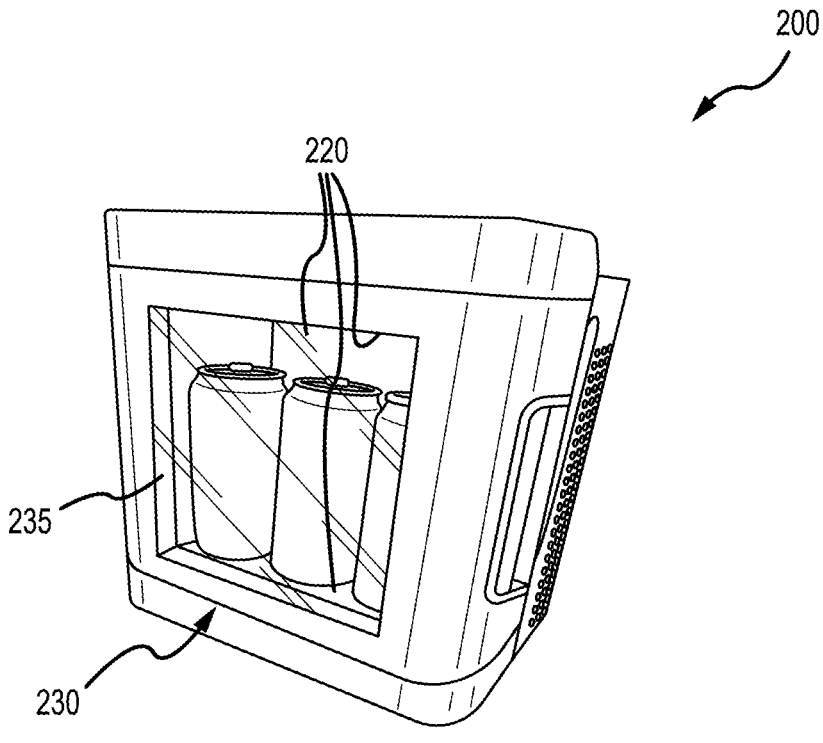
FIG. 2 illustrates a micro-chiller unit integrated with a component of a roll bond evaporator configured to form one or more interior walls of its interior cavity to chill the interior cavity of the unit in accordance with various embodiments.

FIG. 2 illustrates a micro-chiller unit integrated with a component of a roll bond evaporator configured to form one or more interior walls of its interior cavity to chill the interior cavity of the unit in accordance with various embodiments. In various embodiments, the micro-chiller unit enclosure 200 illustrated in FIG. 2 may be configured in an aircraft monument (such as an in-seat of galley car) with the roll bond evaporator component 220 integrated or configured as one or more walls of its interior cavity 235. In various embodiments, the roll bond evaporator component 220 may be configured in micro-chiller unit enclosures 200 used in aircraft galley carts or galley compartments or other enclosures in the aircraft. It is contemplated that the roll bond evaporator component 220 can be configured for use in variety of aircraft monuments with the interior of the aircraft. It is also contemplated that the roll bond evaporator component 220 can be integrated to form several walls of the interior cavity 235 of the micro-chiller unit enclosure 200 including sets of one, two, three or more walls. In various embodiments, the sets of walls may include sides of the interior cavity (compartment) 235 such as the top wall, rear wall, and bottom wall, or a right-side wall, rear wall, and left side wall (see FIG. 1) when a U-shaped bond evaporator component is used that can be configured to cover a set of three walls. In various embodiments, the roll bond evaporator component 220 may be configured as a single wall (i.e., the rear wall of the interior cavity). In other embodiments, the roll bond evaporator component 220 may be configured as two interior cavity or compartment walls such as the rear wall and the bottom wall. There are variety of different combinations of roll bond evaporator walls contemplated to form the interior cavity made up of walls or sides (excluding the door side of the compartment).

In various embodiments, the internal volume of the enclosed space/cavity of the compartment 230 may be configured in dimensions of approximately or in the range of 8 inches (20.32 centimeters) in height, 9 inches (22.86 centimeters) in width and 3.00 (7.62 cm) inches depth. In various embodiments, the compartment 30 (interior space) of the micro-chiller unit in the exterior housing 205 can store about three 12-fluid-ounces (355-millimeter) soda cans of beverages (e.g., a typical soda can is of a size of about 2.6 inches (about 6.604 centimeters) in diameter and 4.83 inches (12.27 centimeters) in height). It is contemplated, that the exterior housing can be configured in a variety of sizes and shapes configured to fit within particular aircraft in-seat compartments, galley carts, and other aircraft monuments.

Figure 3:
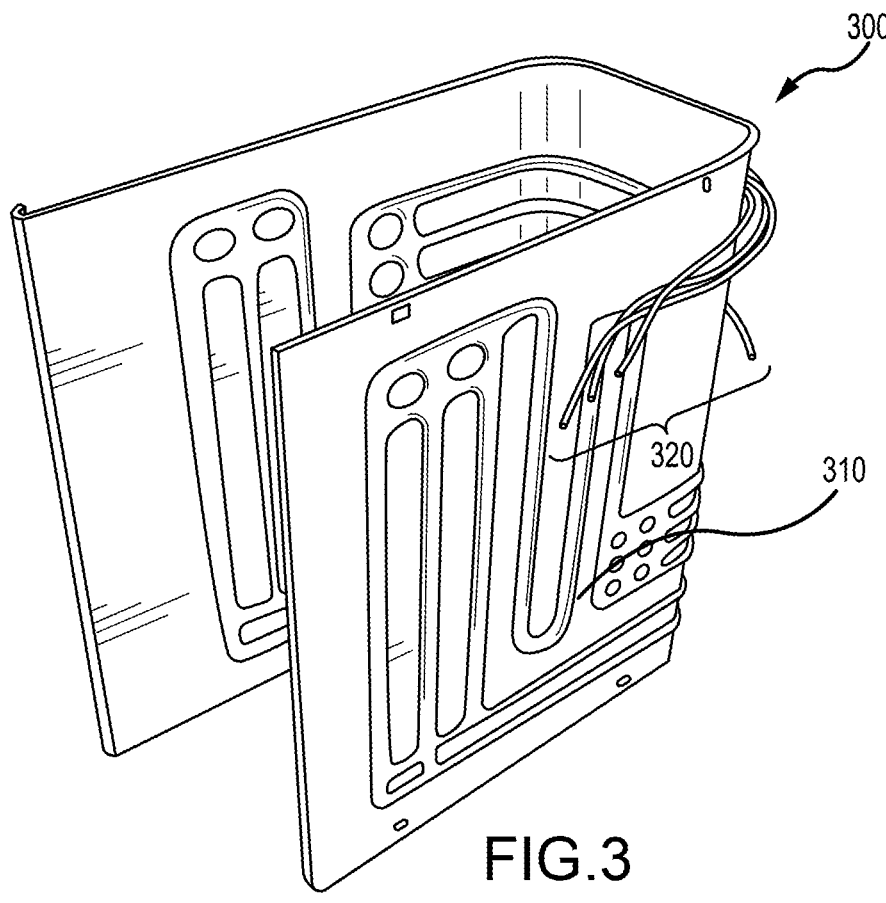
FIG. 3 illustrates a diagram of a roll bond evaporator that can be configured for use with the micro-chiller unit in FIGS. 1-2 for chilling the interior cavity of the unit in accordance with various embodiments.

Referring to FIG. 3, FIG. 3 illustrates a diagram of a roll bond evaporator 300 that can be configured for use with the micro-chiller unit and enclosure in FIGS. 1-2 for chilling the interior cavity of the unit in accordance with various embodiments.

In FIG. 3 there is shown the roll bond evaporator 300 in a U-shaped configuration that can be configured to wrap around (i.e., to cover) several regions of the interior cavity of a micro-chiller unit. For example, the U-shaped configuration can cover the sides and rear of the interior cavity. In instance, the roll bond evaporator 300 is configured as an aluminum structure that can be integrated into the interior cavity to form multiple sides/walls of the interior cavity.

In various embodiments, one or more sides of the interior cavity of a cart bay or other compartment in a monument in an aircraft can be configured with a set of serpentine tubes 310 that may surround part of an internal space for chilling and includes inlets (input) and outlets (output) 320 for pumping in and out the chilled liquid (i.e., glycol liquid) circulated within the tubes serpentine embedded in patterns of the U-shaped aluminum structure configured to make up multiple sides of a chilled interior cavity.

In FIG. 3, the U-shaped roll bond evaporator component 300 can be implemented with a micro-chiller unit that is a glycol chiller (ring shaped liquid chiller) that is configured with a set of thermo-couple elements, a heat sink that chills glycol pumped or pushed through a closed loop system of serpentine tubes 310 configured in the U-shaped roll bond evaporator 300 to chill the interior space of a micro-chiller unit.

In various embodiments, the u-shaped roll bond evaporator 300 is fabricated by rolling together two sheets of aluminum applying heat and pressure during the rolling process such that the two sheets are effectively welded together into a single sheet. By applying special coating (e.g., a "weld stop") or a chemical ink between the sheets before the rolling/welding operation, the two sheets are prevented from being welded together in areas where the coating is applied.

Figure 4:
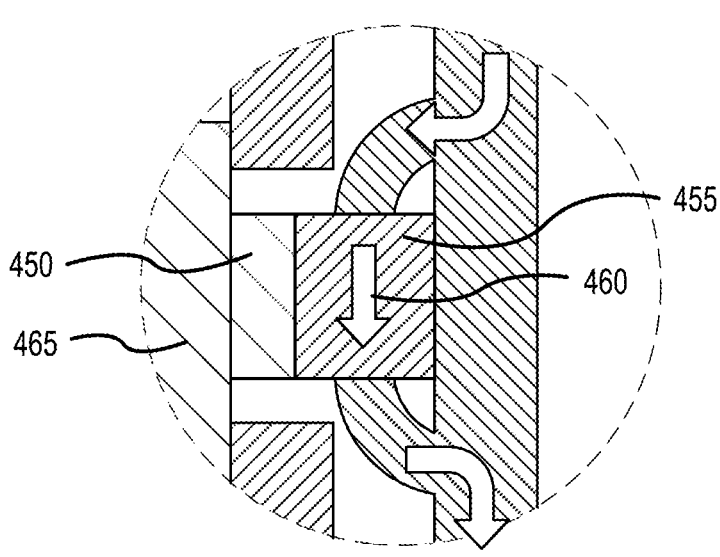
FIG. 4 illustrates a diagram configuration of an assembly of the micro-chiller unit that circulates the chilled liquid in the interior cavity accordance with various embodiments.

FIG. 4 illustrates a diagram configuration of an assembly of the micro-chiller unit that circulates the chilled liquid in accordance with various embodiments. In FIG. 4, there is shown a micro-chiller unit 400 of thermo-electric elements (e.g., the Peltier elements) 450, the ring-shaped liquid chiller 455, the glycol circulation pump 460, and the (micro-chiller) heat sink 465. The heat sink 465 repels the warmer air and enables the thermo-electric elements 450 to chill the exposed glycol liquid in the ring-shaped liquid chiller 455 as the liquid is circulated past the thermo-electric elements 450 being received from an outlet (not shown) of a tube of the roll bond evaporator component 300 (in FIG. 3) to an inlet (not shown) of a tube of the roll bond evaporator component 300 to enable the circulation of chilled liquid in a serpentine tube structure across the face of each side of the interior cavity configured with roll bond evaporator component 300.

Figure 5:
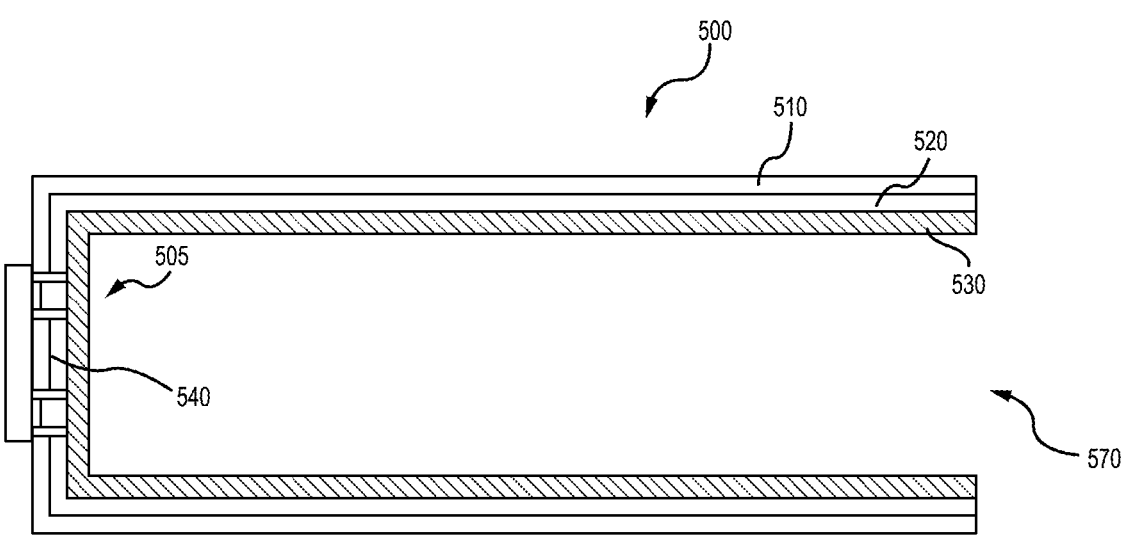
FIG. 5 illustrates a configuration of a U-shaped roll bond evaporator with a micro-chiller unit of a cart bay in accordance with various embodiments.

FIG. 5 illustrates a configuration of the (U-shaped) roll bond evaporator with a micro-chiller unit of a cart bay in accordance with various embodiments. In FIG. 5, there is shown a cart bay 500 with an interior (cart bay) cavity 570. The cart bay 500 may have an exterior housing 510 and a roll bond evaporator component 520 configured in a side of the interior cavity 570. In various embodiments, multiple micro-chiller units 505 may be mounted on a rear wall of the housing 510 of the cart bay 500 with a single pump 540 configured between for circulating the chilled liquid. Here, a first micro-chiller unit 505 receives the output from the roll bond evaporator component 520 (i.e., the liquid circulated in the tubing) that is conveyed by the pump 540 to a second (serially coupled) micro-chiller unit 505 that further chills the liquid before it was pumped into the tubes of the roll bond evaporator component 520 for circulation across a side of the interior cavity. The liquid may also be chilled in a reverse flow process in an opposite direction as it is circulated from side to side of the interior cavity 570. In various embodiments, as chilled air is circulated in the interior, the chilled air is kept chilled (i.e., kept at a steady chilled temperature) as heat seepage that enter the walls of the housing 510 is intercepted by the chilled liquid circulated. With the circulated air, rather than circulated chilled liquid, heat seepage enters the air stream and heats the cart bay (i.e., cart bay cavity 570); this is prevented by the barrier created by the chilled liquid circulated in the wall of the interior cavity 570 that prevents the heat entering the air stream in the interior. Because the heat load in the chilled space (i.e., interior cavity 570) is due to heat leaking through the walls intercepted by the roll bond evaporator component, a larger heat sink to remove the heat is not required. Further, the roll bond evaporator component can be augmented by a heat sink (465 in FIG. 4) to speed the pull down the temperature of the interior cavity.

FIG. 6 illustrates a flow diagram 600 configuring a roll bond evaporator with a micro-chiller unit in accordance with various embodiments. At step 610, a cooling assembly is configured of a housing and a compartment disposed in the housing wherein the compartment is formed with one or more sides a roll bond evaporator component with a set of embedded tubes disposed to circulate chilled liquid to chill an interior cavity of the compartment. At step 620, a micro-chiller unit configured within the housing to chill the liquid circulated in the roll bond evaporator component across a face of a side of the compartment. The roll bond evaporator component intercepts heat seepage into the interior cavity by circulation of chilled liquid that removes the heat and can maintain a steady state chilled condition of the interior cavity.

At step 630, a heat sink is mounted in the assembly and expels warmer air to enable chilling of liquid circulated from the roll bond evaporator component across a side of the compartment. At step 640, the heat sink is configured to augment cooling of the roll bond evaporator component when drawing down a temperature of the interior cavity. The heat sink also acts with the roll bond evaporator to effectuate a pull-down temperature of the interior cavity of the compartment.

At step 650, the liquid is composed of a set of coolants of at least a glycol-water coolant, an ethylene glycol coolant, and a propylene glycol coolant.

At step 660, the assembly is configured with a pair of micro-chiller units on a side of the interior cavity; and a pump positioned between the pair of micro-chiller units to circulate the liquid between each micro-chiller unit to chill the liquid and to chill the interior cavity by circulation of chilled liquid via at least one side of the interior cavity that comprises the roll bond evaporator component. In various embodiments, the roll bond evaporator component can be configured in a U-shape for a U-shaped roll bond evaporator component that can make up more than one side of the interior cavity. In various embodiment, the assembled elements in the housing can be placed in a galley bay of an aircraft galley monument and operate as a stand-alone unit.

At step 670, the assembly can be configured with the micro-chiller unit having applied a polarity in a forward direction to cool the interior cavity with chilled liquid circulated in the roll bond evaporator component, and to apply the polarity in the reverse direction to heat the interior cavity with warmed liquid circulated in the roll bond evaporator component.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 312(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An assembly comprising:
a housing having a rear wall, a first side wall, a second side wall, a top, and a bottom;
a compartment disposed in the housing wherein the compartment is formed by at least one side with a roll bond evaporator component extending proximate at least one of the first side wall or the second side wall and using embedded tubes to circulate chilled liquid to chill an interior cavity of the compartment;
a micro-chiller unit configured within the rear wall of the housing to chill liquid circulated in the roll bond evaporator component across the at least one side of the compartment wherein the roll bond evaporator component is configured to intercept heat seepage into the interior cavity by circulation of the chilled liquid to maintain a steady state chilled condition of the interior cavity, the micro-chiller unit comprising:
a ring-shaped liquid chiller disposed within the rear wall,
a heat sink configured to repel warmer air, and
thermo-electric elements disposed between the ring-shaped liquid chiller and the heat sink, the thermo-electric elements configured to chill the liquid; and
a pump disposed within the rear wall and configured to circulate the liquid through the embedded tubes and the ring-shaped liquid chiller.

2. The assembly of claim 1, wherein the heat sink is configured to remove heat from the liquid when chilling liquid circulated by the roll bond evaporator component across the at least one side of the compartment.

3. The assembly of claim 2, wherein the heat sink is configured to augment cooling of the roll bond evaporator component in response to decreasing a temperature of the interior cavity.

4. The assembly of claim 2, wherein the heat sink is configured to act with the roll bond evaporator component to effectuate a pull-down temperature of the interior cavity of the compartment wherein the pull-down temperature comprises the steady state chilled condition of the interior cavity of the temperature within a range of 36° F. to 50° F.

5. The assembly of claim 4, wherein the liquid is a mixture comprising a set of coolants of at least a glycol-water coolant, an ethylene glycol coolant, and a propylene glycol coolant.

6. The assembly of claim 5, further comprising:
a pair of micro-chiller units configured on a side of the interior cavity;
wherein the pump is positioned between the pair of micro-chiller units;
wherein the pump is configured to circulate the liquid between each micro-chiller unit to chill the liquid and to chill the interior cavity by circulation of the chilled liquid via at least one side of the interior cavity that comprises the roll bond evaporator component.

7. The assembly of claim 1, wherein the roll bond evaporator component is configured in a U-shape having a rear portion disposed along the rear wall, a first side portion disposed along the first side wall, and a second side portion disposed along the second side wall.

8. The assembly of claim 7, wherein multiple sides of the interior cavity are formed by the U-shape of the roll bond evaporator component.

9. The assembly of claim 1, wherein the housing is configured as a galley bay of an aircraft galley monument wherein the galley bay is configured to operate a stand-alone unit.

10. The assembly of claim 1, wherein the micro-chiller unit is configured to apply a polarity in a forward direction to cool the interior cavity with the chilled liquid circulated in the roll bond evaporator component, and to apply the polarity in a reverse direction to heat the interior cavity with warmed liquid circulated in the roll bond evaporator component.

11. An apparatus comprising:
an exterior housing formed to be integrated in a galley bay, wherein the exterior housing is configured with a set of elements comprising:
an interior housing having a rear wall, a first side wall, a second side wall, a top, and a bottom;
a roll bond evaporator component;
a micro-chiller unit configured within the rear wall of the interior housing, the micro-chiller unit comprising:
a ring-shaped liquid chiller disposed within the rear wall,
a heat sink configured to repel warmer air, and
thermo-electric elements disposed between the ring-shaped liquid chiller and the heat sink, the thermo-electric elements configured to chill the liquid; and
a pump disposed within the rear wall and configured to circulate the liquid through the roll bond evaporator component;
wherein the interior housing is chilled by liquid circulated between the micro-chiller unit mounted on a side of the interior housing and the roll bond evaporator component that forms at least one of the first side wall or the second side wall of the interior housing;

wherein an input of the roll bond evaporator component is attached to the micro-chiller unit configured to receive liquid chilled by the micro-chiller unit;

wherein an output of the roll bond evaporator component is attached to the micro-chiller unit to send liquid to remove heat intercepted from the at least side of the interior housing formed by the roll bond evaporator component.

12. The apparatus of claim 11, wherein the roll bond evaporator component is configured to chill the interior housing by chilled liquid circulated in a set of tubes configured in a serpentine pattern across at least one face of the first side wall or the second side wall of the interior housing formed by the roll bond evaporator component and enables an interior space to be exposed to the chilled liquid circulated within the roll bond evaporator component for cooling the interior space.

13. The apparatus of claim 12, wherein the roll bond evaporator component is configured in a U-shape to form the first side wall, the rear wall, and the second side wall of the interior housing.

14. The apparatus of claim 13, wherein the liquid is a mixture comprising a set of coolants of at least a glycol-water coolant, an ethylene glycol coolant, and a propylene glycol coolant.

15. The apparatus of claim 14, wherein the exterior housing is configured for a galley bay wherein the galley bay is configured to operate as a stand-alone unit.

16. The apparatus of claim 15, further comprising:
a pair of micro-chiller units configured on a side of the interior housing;
wherein the pump is positioned between the pair of micro-chiller units;
wherein the pump is configured to circulate the liquid between each micro-chiller unit to chill the liquid and to chill the interior housing by circulation of the chilled liquid via at least one side of the interior housing that comprises the roll bond evaporator component.

* * * * *